US010024427B1

(12) United States Patent
Gessner et al.

(10) Patent No.: US 10,024,427 B1
(45) Date of Patent: Jul. 17, 2018

(54) SYSTEM AND METHOD FOR RATIO CONTROL IN A VEHICLE CONTINUOUSLY VARIABLE TRANSMISSION

(71) Applicant: GM GLOBAL TECHNOLOGY OPERATIONS LLC, Detroit, MI (US)

(72) Inventors: James M Gessner, Hartland, MI (US); Christopher J Weingartz, Fenton, MI (US); John E Marano, Hartland, MI (US); Cole Reinhold, Linden, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/409,628

(22) Filed: Jan. 19, 2017

(51) Int. Cl.
| | |
|---|---|
| *F16H 61/66* | (2006.01) |
| *F16H 61/662* | (2006.01) |
| *B60R 16/023* | (2006.01) |
| F16H 59/70 | (2006.01) |
| F16H 61/00 | (2006.01) |

(52) U.S. Cl.
CPC ....... *F16H 61/662* (2013.01); *B60R 16/0236* (2013.01); *F16H 61/66* (2013.01); F16H 2059/704 (2013.01); F16H 2061/0096 (2013.01)

(58) Field of Classification Search
None
See application file for complete search history.

(56) References Cited

U.S. PATENT DOCUMENTS

| | | | | |
|---|---|---|---|---|
| 4,743,223 A | * | 5/1988 | Tokoro | B60W 30/18 474/28 |
| 4,782,934 A | * | 11/1988 | Takano | B60W 10/02 192/3.56 |
| 4,794,819 A | * | 1/1989 | Tanaka | B60W 10/06 477/49 |
| 4,819,513 A | * | 4/1989 | Morimoto | B60W 30/18 477/43 |
| 4,833,944 A | * | 5/1989 | Tanaka | B60W 30/18 477/139 |
| 4,986,396 A | * | 1/1991 | Morimoto | B60W 10/06 477/180 |
| 5,005,442 A | * | 4/1991 | Sakakibara | B60W 10/06 477/40 |
| 5,020,392 A | * | 6/1991 | Morimoto | B60W 30/18 477/49 |
| 7,097,587 B2 | | 8/2006 | Kanafani et al. | |
| 8,694,217 B2 | | 4/2014 | Fleming et al. | |
| 2003/0158646 A1 | * | 8/2003 | Nishida | F16H 61/66259 701/51 |

* cited by examiner

*Primary Examiner* — Justin Holmes

(57) ABSTRACT

A method and system for controlling a ratio of a continuously variable transmission coupling a prime mover to a driven member in a vehicle. The method includes determining a current ratio of the continuously variable transmission, determining a projected ratio from a first ratio path of a predetermined ratio map, calculating a gradient between the current ratio and the projected ratio, determining whether the calculated gradient satisfies a gradient constraint, setting a control ratio to the projected ratio if the calculated gradient satisfies the gradient constraint, setting a control ratio to a modified ratio if the calculated gradient does not satisfy the gradient constraint, the modified ratio being based upon a ratio that satisfies the gradient constraint, and controlling the ratio of the continuously variable transmission to the control ratio.

20 Claims, 7 Drawing Sheets

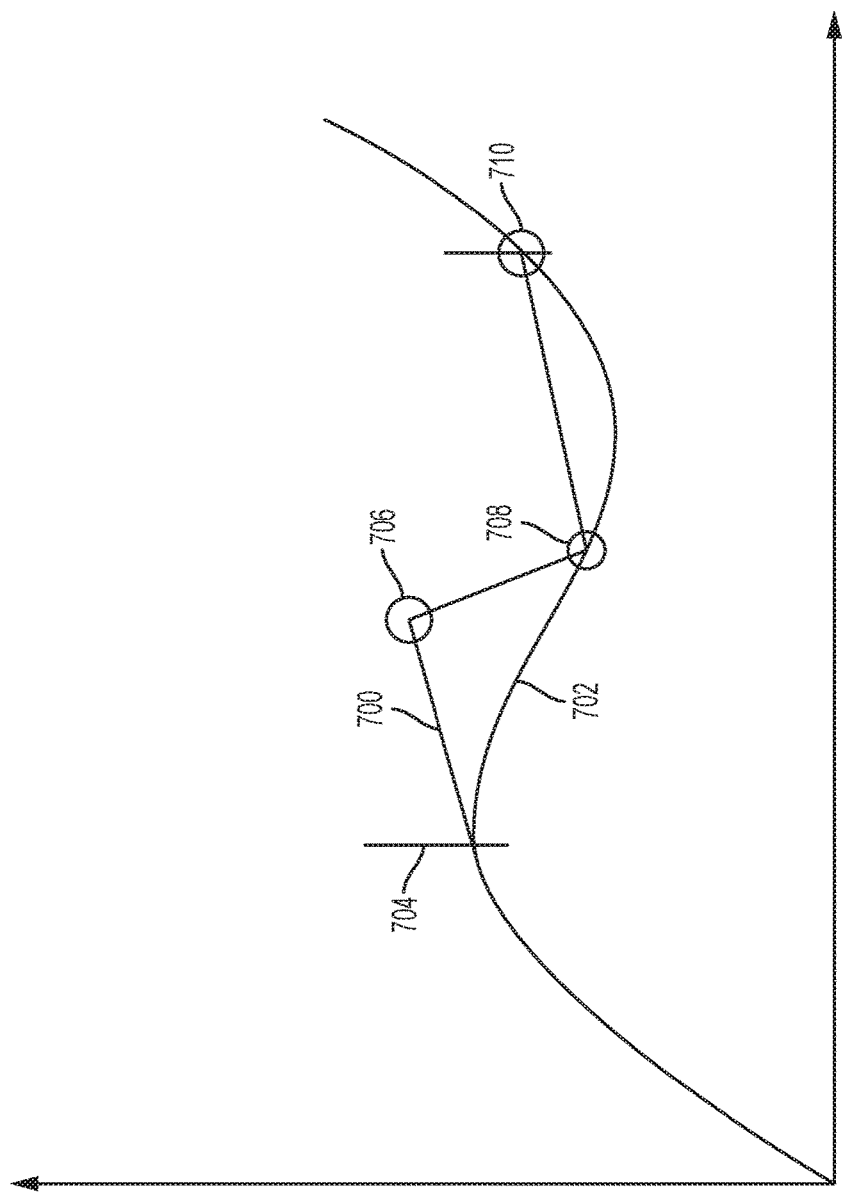

SYSTEM AND METHOD FOR RATIO CONTROL IN A VEHICLE CONTINUOUSLY VARIABLE TRANSMISSION

FIELD

The present disclosure relates to a system and method for ratio control in a vehicle continuously variable transmission.

INTRODUCTION

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Conventional vehicle transmissions, including manual and automatic transmissions, have a plurality of discrete gear ratios. These transmissions may switch between the discrete gear ratios (gear changes) based on various conditions, such as, for example, pedal position, vehicle speed and the like. However, these transmission are limited in only providing one of a limited number discrete gear ratios at any particular moment. Drivers and passengers in vehicles incorporating such transmissions have developed certain expectations based upon their experiences in operating these types of vehicles. For example, as the speed of such a vehicle increases, while maintaining one of these discrete gear ratios, the engine speed rises in direct proportion with the vehicle speed.

Another type of vehicle transmission is known as a continuously variable transmission (CVT). A CVT has the ability to continuously vary the gear ratio across an infinite number of gear ratios. In this manner, a CVT is not limited to any discrete number of gear ratios and is able to greatly increase efficiency and performance by optimizing the gear ratio across an infinite number of ratios. Unlike a manual or automatic discrete ratio transmission, a CVT may be operated to optimize performance and/or efficiency by controlling the ratio.

CVTs are generally controlled in accordance with a predefined ratio map which determines a gear ratio for the CVT based upon varying conditions. Such a ratio map is typically defined during a calibration process. For example, the predefined ratio map may be designed to optimize fuel efficiency of the vehicle incorporating the CVT based upon various inputs, such as, driver accelerator pedal position, vehicle speed, or the like. An exemplary predefined ratio map 100 is illustrated in FIG. 1. The predefined ratio map 100 illustrates multiple exemplary ratio paths 102 with which a CVT may be controlled based upon vehicle speed and driver acceleration demand (such as, for example, driver pedal position). In this graph, the horizontal axis corresponds to a vehicle speed and the vertical axis corresponds to the transmission input speed. The ratio paths may have each been determined by calibration to provide optimum and/or improved fuel economy. Each ratio path differs based upon the input signal received from the driver's throttle pedal position. If the throttle pedal position changes, then another ratio path may be followed. As is clearly illustrated, unlike a manual and/or automatic transmission, transmission input speed may decrease and/or remain flat even while vehicle speed increases. A driver or passenger who is accustomed to a vehicle having a limited number of discrete gear ratios may be expecting the engine speed to increase in direct proportion to the vehicle speed. When the vehicle incorporating the CVT does not respond in that manner, the driver and/or passenger may get the mistaken impression that something is wrong with the vehicle transmission.

To avoid this mistaken impression, vehicle manufacturers have provided predefined ratio maps which ensure that the driver/occupant experience complies with their expectations and/or perceptions. Expectations and perceptions which may have been developed by operating vehicles only having discrete gear ratios. FIG. 2 illustrates a predefined ratio map 200 where the gradient for each ratio path 202 corresponding to a throttle pedal position is constrained to prevent it from having a negative slope such that the engine speed always increases with vehicle speed. Not only does this predefined ratio map not provide optimal fuel economy, but it may also lead to another problem of an impression given to a vehicle occupant of a slipping feeling at some intermediate driver pedal positions such as those portions of the ratio paths 202 within the circle 204. For example, even when a driver holds the pedal position constant, while the vehicle speed increases, the gradient may vary. Again, the driver and/or passenger who is inexperienced or not knowledgeable about the operation of a CVT may get the mistaken impression that something is wrong.

In addition to the problems discussed above, conventional systems which are only capable of following predefined ratio maps is that it has resulted in large compromises between following a predefined ratio map that caters to idealized expectations of an occupant accustomed to transmissions having a limited number of discrete ratios and those predefined ratio maps that might otherwise provide more optimized performance and/or fuel economy.

SUMMARY

In an exemplary aspect, a propulsion system for a vehicle includes a prime mover having a rotating member, a rotating member sensor that outputs a rotating member speed signal, a driven member, a driver input sensor that outputs a driver input signal, a continuously variable transmission coupling the prime mover to the driven member, and a processor that is programmed to determine a current ratio of the continuously variable transmission, determine a projected ratio from a first ratio path of a predetermined ratio map, calculate a gradient between the current ratio and the projected ratio, determine whether the calculated gradient satisfies a gradient constraint, to set a control ratio to the projected ratio if the calculated gradient satisfies the gradient constraint, to set a control ratio to a modified ratio if the calculated gradient does not satisfy the gradient constraint, where the modified ratio is based upon a ratio that satisfies the gradient constraint, and to control the ratio of the continuously variable transmission to the control ratio.

In another exemplary aspect, the processor is further programmed to prior to controlling the ratio of the continuously variable transmission determine whether a transition condition has been met, and set the control ratio to a ratio on a second ratio path on the predefined ratio map.

In another exemplary aspect, the transition condition includes a change in driver input signal.

In another exemplary aspect, the transition condition includes a period of time elapsing while a driver input signal remains substantially constant.

In another exemplary aspect, the transition condition includes a rate of change of driver input signal exceeding a predetermined threshold.

In another exemplary aspect, the transition condition includes a vehicle speed exceeding a predetermined threshold.

In another exemplary aspect, the predefined ratio map corresponds to an optimized fuel economy ratio map.

In another exemplary aspect, the gradient constraint includes a range of ratio path slopes.

In another exemplary aspect, the gradient constraint includes a positive ratio path slope.

In another exemplary aspect, the driver the driver input sensor includes a driver pedal position sensor and the driver input signal includes a driver pedal position signal.

In another exemplary aspect, a method for controlling a ratio of a continuously variable transmission coupling a prime mover to a driven member in a vehicle includes determining a current ratio of the continuously variable transmission, determining a projected ratio from a first ratio path of a predetermined ratio map, calculating a gradient between the current ratio and the projected ratio, determining whether the calculated gradient satisfies a gradient constraint, setting a control ratio to the projected ratio if the calculated gradient satisfies the gradient constraint, setting a control ratio to a modified ratio if the calculated gradient does not satisfy the gradient constraint, where the modified ratio is based upon a ratio that satisfies the gradient constraint, and controlling the ratio of the continuously variable transmission to the control ratio.

In this manner, the present disclosure is capable of meeting the expectations of the vehicle occupant by constraining the gradient of the gear ratio in real-time while enabling switching between more optimal ratio map paths. This not only addresses driver/passenger perceptions and drivability concerns, but also significantly improves performance of the propulsion system such as providing much improved fuel economy in those situations where occupant perceptions permit.

In stark contrast to conventional systems, an exemplary embodiment of the methods and systems of the present disclosure determines the current gear ratio, determines a projected gear ratio from a predetermined ratio map, calculates a gradient between the current gear ratio and the projected gear ratio, determines whether the calculated gradient satisfies a gradient constraint and controls the ratio of the continuously variable transmission to the projected gear ratio if the calculated gradient satisfies the gradient constraint or if the calculated gradient does not satisfy the gradient constraint, calculates a modified gear ratio that satisfies the gradient constraint and controls the ratio of the continuously variable transmission to the modified gear ratio.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the present invention are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein:

FIG. 7 is a graph illustrating another actual ratio path provided by an exemplary method and system in accordance with the present disclosure.

DETAILED DESCRIPTION

Figure 1:
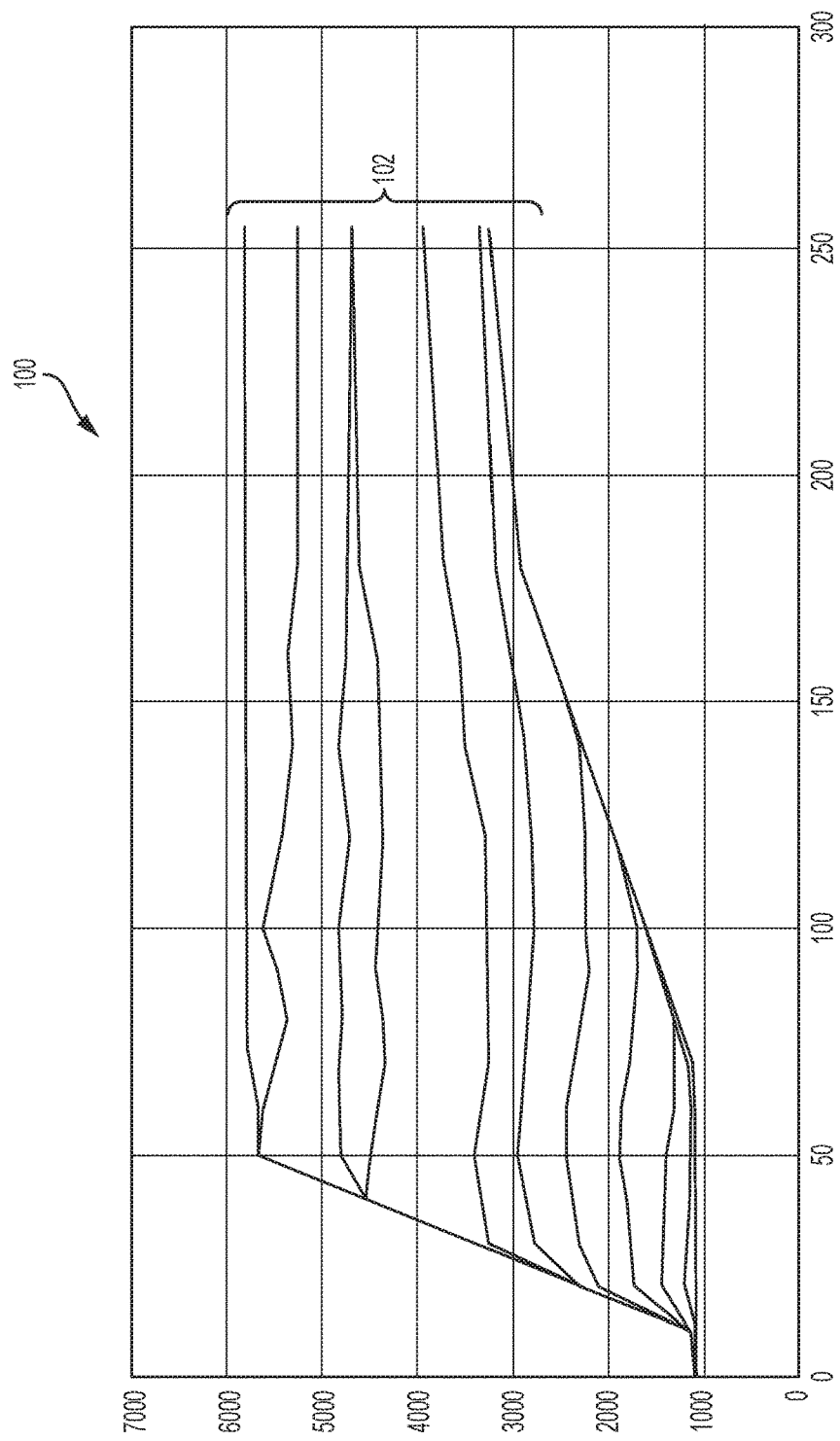
FIG. 1 is an example of a fuel economy optimized predefined ratio map for a continuously variable transmission with an input speed/vehicle speed gradient constraint.
Figure 2:
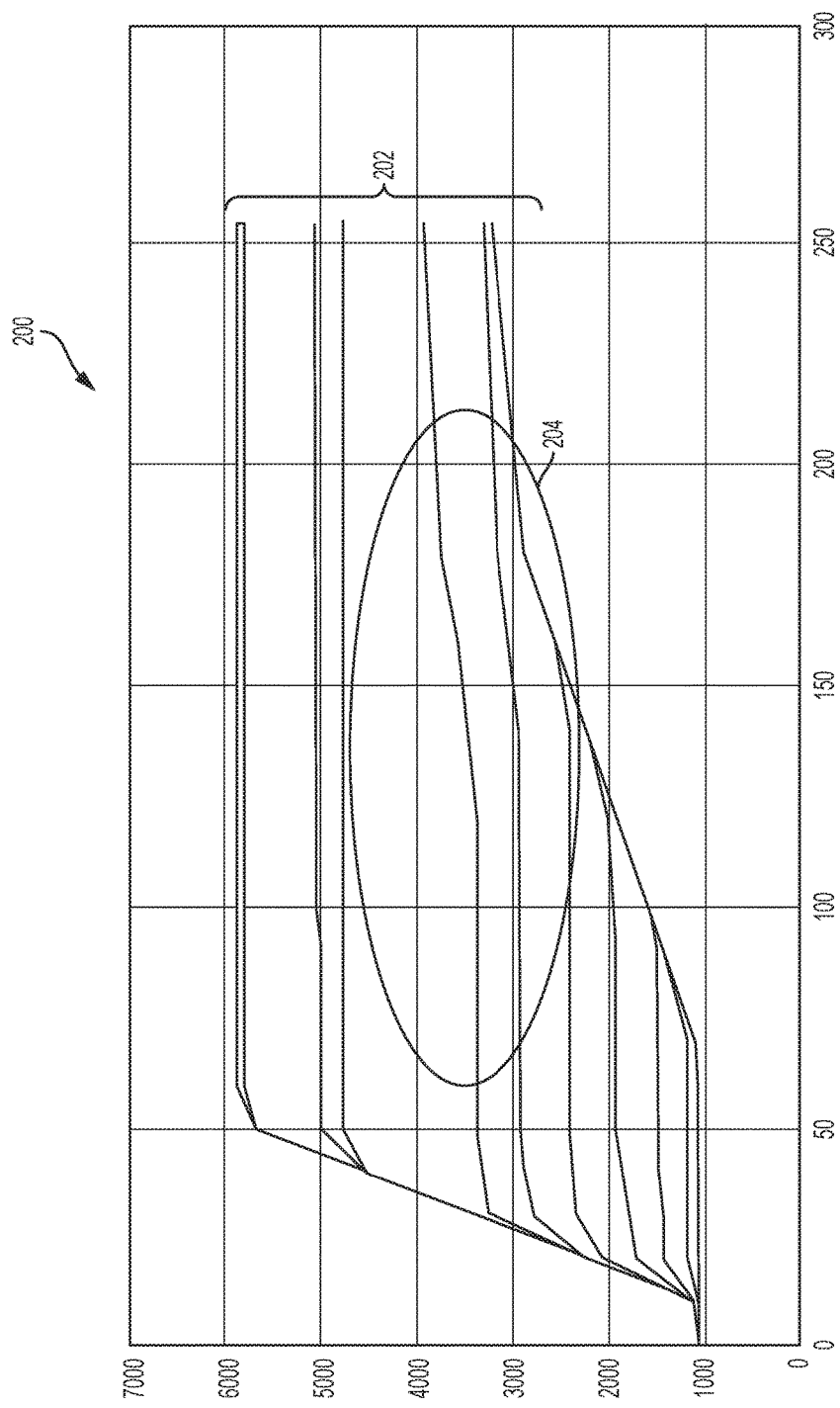
FIG. 2 is another predefined gear ratio map for a continuously variable transmission.
Figure 3:
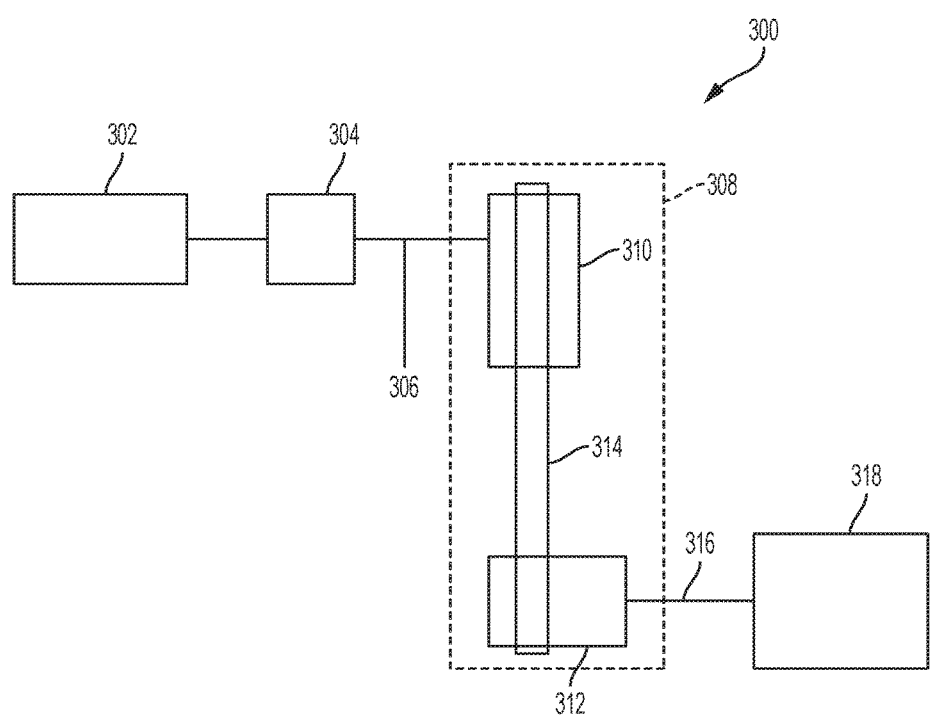
FIG. 3 is a schematic illustration of a vehicle propulsion system in accordance with an exemplary embodiment of the present disclosure.

FIG. 3 is a schematic illustration of an exemplary propulsion system 300 in accordance with the present disclosure. The propulsion system 300 includes a prime mover 302, such as, for example, an internal combustion engine, a motor, or the like. The prime mover 302 provides a source of torque to a coupling device 304 such as, for example, a clutch, a torque converter, or the like. The coupling device 304 selectively provides the torque to an input shaft 306 of a continuously variable transmission 308. The continuously variable transmission 308 includes a primary pulley 310 coupled to a secondary pulley 312 via a belt 314. The secondary pulley 312 provides torque to an output shaft 316 that is coupled to a drive member 318. The drive member 318 receives the torque and provides a motive force to, for example, drive wheels of a vehicle.

An exemplary embodiment of the ratio control system and method for the continuously variable transmission determines in real time if the gradient between a current ratio and a projected ratio from a ratio path on a predetermined ratio map satisfies a gradient constraint and, if so, controls the ratio of the continuously variable transmission to the projected ratio, and if not, calculates a modified ratio that satisfies the gradient constraint and controls the ratio of the continuously variable transmission to the modified ratio. This is in stark contrast to conventional methods and systems which control the ratio of a continuously variable transmission such that it follows the ratio paths defined by a predetermined ratio map and does not modify the ratio conditionally in real time in the instance where the ratios of the predetermine ratio map do not satisfy the gradient constraint.

While the present disclosure generally refers to a predefined or predetermined ratio map that may have been defined during a calibration process to optimize fuel efficiency, those of ordinary skill in the art understand that any ratio map may be predefined and may be optimized for other purposes such as, for example, drivability, a sport or performance mode, steep inclines, high altitudes or the like, without limitation and remain within the scope of the present disclosure.

In order to satisfy preconceived expectations of a driver, a gradient constraint may be defined, for example, to ensure that the engine speed does not decrease or gradually increases while a vehicle speed increases. Those of ordinary skill in the art will understand that the gradient constraint may be defined in any manner, without limitation, and still form a portion of the present disclosure.

Figure 4:
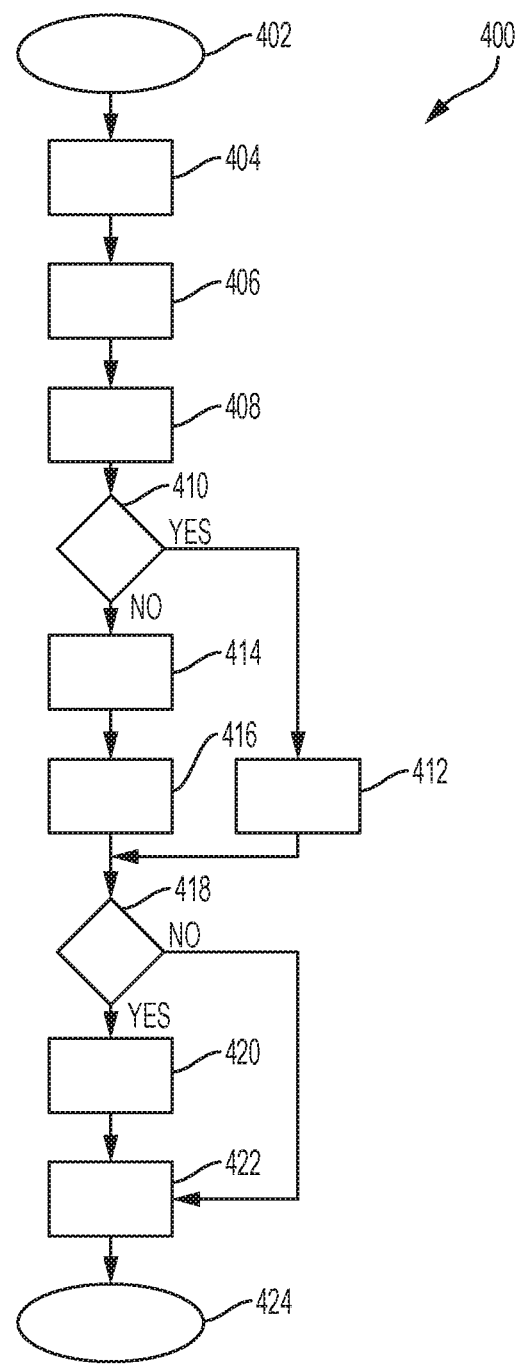
FIG. 4 illustrates a flowchart for an exemplary method in accordance with the present disclosure.

FIG. 4 illustrates a flowchart 400 of a method for controlling a ratio of a continuously variable transmission in accordance with an exemplary embodiment of the present disclosure. The method starts at step 402 and continues to step 404 where the method determines the current ratio of the continuously variable transmission and continues to step 406. In step 406, the method refers to a predetermined ratio map to determine a projected ratio and continues to step 408. In step 408, the method calculates the gradient between the current ratio and the projected ratio and continues to step 410. In step 410, the method determines whether the calculated gradient satisfies a gradient constraint. If, in step 410, the method determines that the calculated gradient satisfies the gradient constraint, then the method continues to step 412 where the method sets a control ratio as the projected ratio and continues to step 418.

Alternatively, if in step 410, the method determines that the calculated gradient does not satisfy the gradient constraint, then the method continues to step 414. In step 414, the method calculates a modified ratio that satisfies the gradient constraint and continues to step 416. In step 417, the method sets the control ratio to the modified ratio and continues to step 418, so that the process repeats. In this manner, the present disclosure, in real time, enables the actual ratio path of the continuously variable transmission to follow the ratio paths defined by a predetermined ratio map, which may have been performance optimized for fuel economy or the like, as long as the gradient constraint is being satisfied, but also ensures that the actual ratio path of the continuously variable transmission always satisfies a gradient constraint if the ratio path from the predetermined ratio map would not satisfy the gradient constraint. The method and system may include a processor that ensures that the gradient constraint is satisfied in real time in every processing loop. Rather than merely following a predetermined ratio map.

In step 418, the method determines whether a transition condition has been met. For example, as will be explained in more detail below, a transition characteristic may be defined as a throttle position being held constant for a predetermined period of time. If, in step 418, the method determines that a transition condition has been met, then the method continues to step 420. In step 420, the method sets the control ratio to a ratio on a ratio path of a predefined ratio map and continues to step 422. In step 422, the method controls the actual ratio of the continuously variable transmission to the control ratio and continues to step 424 where the process returns to step 402 to repeat the process. If, however, in step 418, the method determines that a transition condition has not been met, then the method jumps to step 422.

Figure 5:
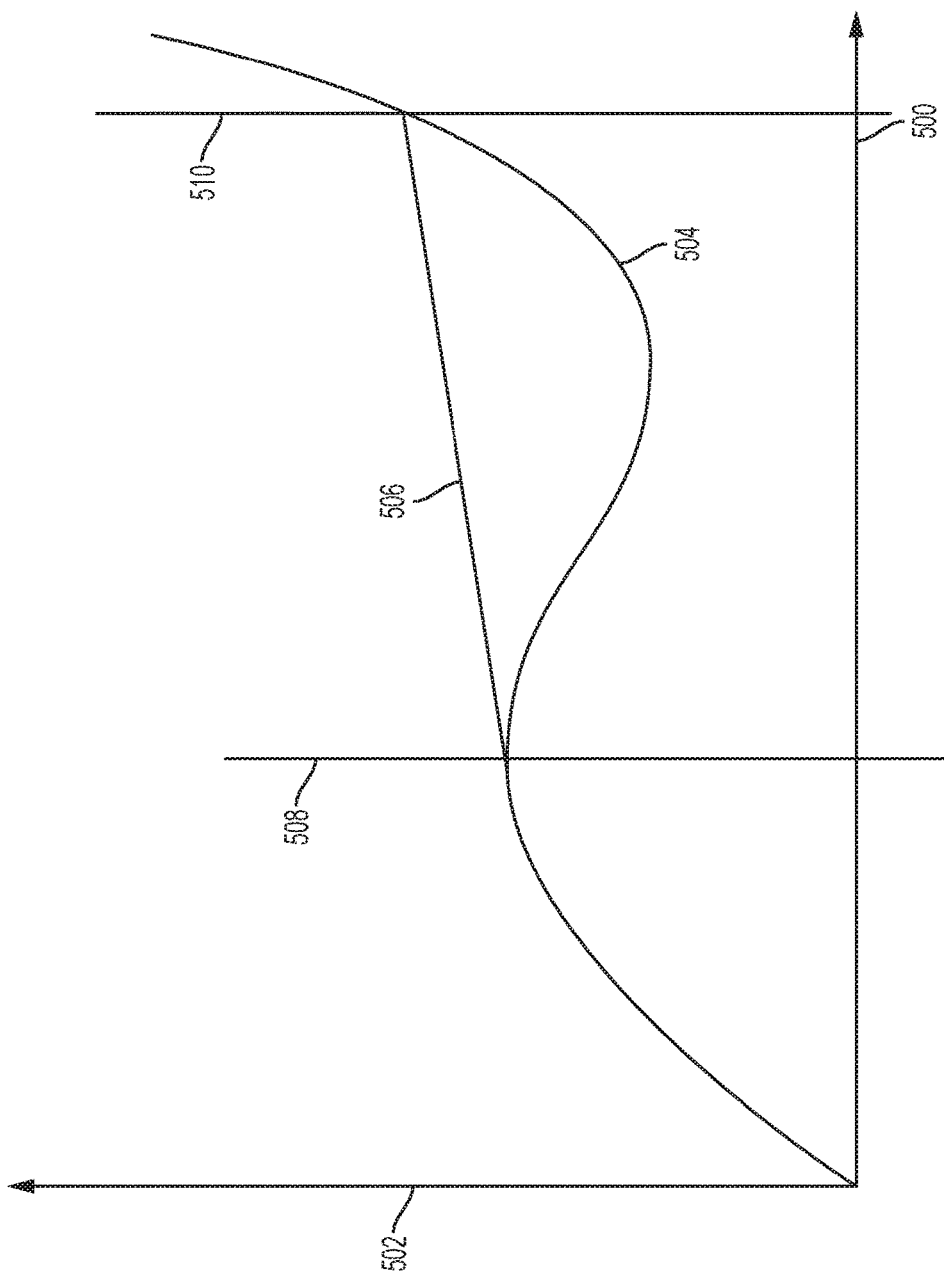
FIG. 5 is a graph illustrating the operation of an exemplary method and system in accordance with the present disclosure.

FIG. 5 is a graph which provides an illustration of the operation of an exemplary method and system in accordance with the present disclosure. The horizontal axis 500 corresponds to vehicle speed and the vertical axis 502 corresponds to engine (prime mover) speed. A single ratio path 504 corresponds to a throttle position from a predetermined ratio map. As explained above, the predetermined ratio map may have been derived from calibration to provide optimum performance, such as, for example, best fuel economy, acceleration, responsiveness, or the like. A continuously variable transmission controller that performs the method of the present disclosure may output a modified ratio path 506 which ensures that the actual ratio path followed by the continuously variable transmission follows the predetermined ratio path 504 so long as that predetermined ratio path satisfies a gradient constraint and also ensures that the actual ratio path does satisfy the gradient constraint when the predetermined ratio path 504 does not.

For example, FIG. 5 illustrates that the actual ratio path 506 follows the predetermined ratio path 504 as long as the gradient does not fall below a specific value (or slope). When the vehicle speed reaches the value at point 508, the method and system determines that the ratio projected along the predetermined ratio path 504 would not satisfy the gradient and thereafter the method and system modifies the ratio such that the actual ratio path always satisfies the gradient constraint. This continues until vehicle speed reaches the value at point 510 where the predetermined ratio path 504 satisfies the gradient constraint and the exemplary method and system then enables the actual ratio path 506 to follow the predetermined ratio path 504. In this manner, the present disclosure adjusts the actual ratio path in real time such that it follows ratio paths which may provide optimum performance while maintaining compliance with a gradient constraint.

Figure 6:
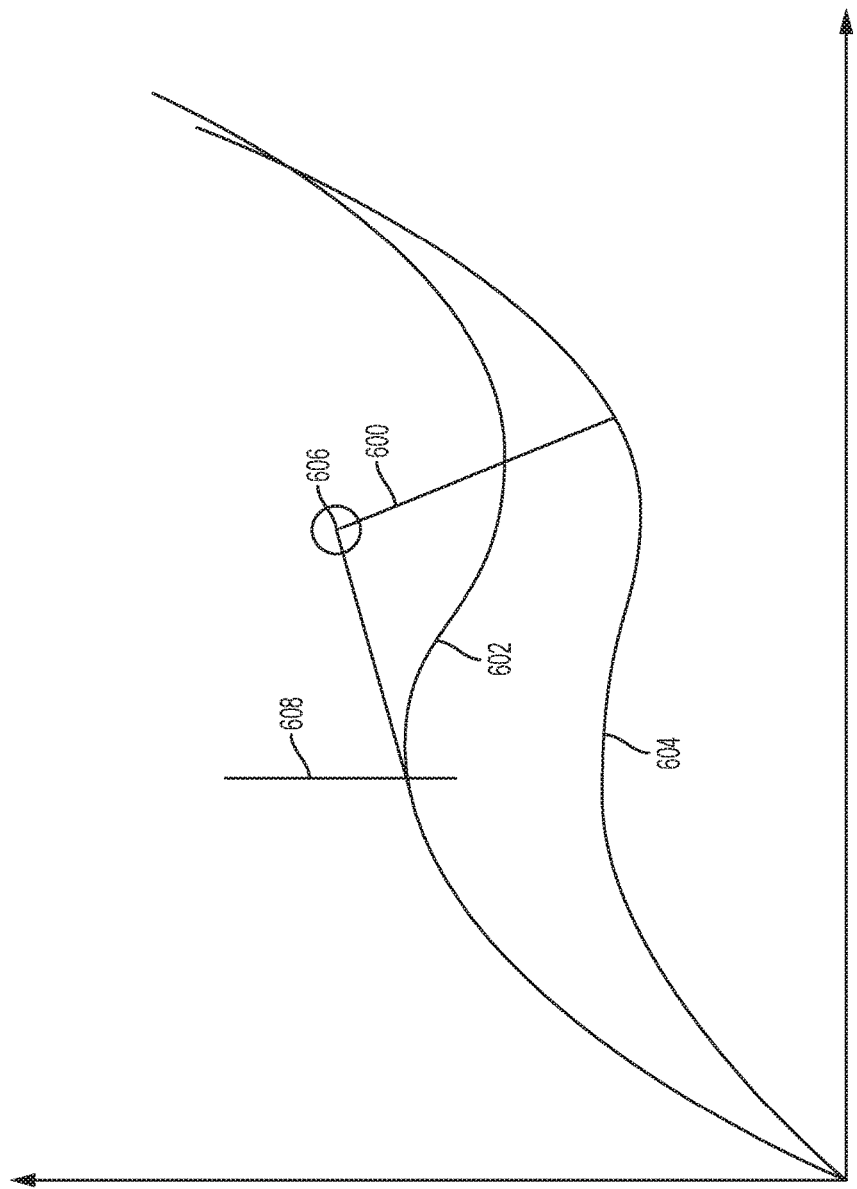
FIG. 6 is a graph illustrating an actual ratio path provided by another exemplary embodiment of the present disclosure.

FIG. 6 is a graph illustrating an actual ratio path 600 provided by another exemplary embodiment of the present disclosure which incorporates the features of the previously described embodiment and also illustrates a response to a throttle pedal position change. The graph includes a first ratio path 602 from a predetermined ratio map corresponding to a first throttle pedal position and a second ratio path 604 from the predetermined ratio map corresponding to a second throttle position. This graph may correspond to a condition where a driver inputs a higher accelerator pedal position to accelerate to a desired vehicle speed and then backs out or reduces the throttle pedal position after achieving the desired vehicle speed. As FIG. 6 illustrates, that the exemplary method and system ensures that the actual ratio path 600 follows the first ratio path 602 corresponding to the higher accelerator pedal position from the predetermined ratio map until vehicle speed 608 is reached where the actual first ratio path 602 no longer satisfies the gradient constraint (just like described previously in relation to FIG. 5). However, the exemplary method and system responds to the reduction in accelerator pedal position to transition the actual ratio path to follow the second ratio path 604, so long as it satisfies the gradient constraint. In this manner, the exemplary method and system takes advantage of the opportunity to adjust the ratio to follow a new ratio path that may have been optimized for improved performance. The gradient of the actual ratio path 600 followed from point 606 to the new second ratio path 604 may be predetermined or calculated to make an appropriate transition.

While the present disclosure has described a transition between a higher accelerator position to a lower accelerator position, the reverse situation is also enabled in a similar manner. Should the accelerator position increase, a transition to a new ratio path from a predefined ratio map is also enabled by the present disclosure, even though this situation is not illustrated. Those of ordinary skill in the art understand that accelerator position may be quite transient while driving because a driver's foot may move quite a bit. The transition condition may be appropriately defined such that a significant accelerator change may classify as a transition condition, whereas more minor changes may not.

FIG. 7 illustrates an actual ratio path 700 provided by an exemplary method and system in accordance with the present disclosure in response to the accelerator position being held substantially constant for a predetermined period of time. This is a condition which will be referred to as an "extended steady state" condition. Although occupants of vehicles having transmissions with a limited number of discrete ratios might not be comfortable with the gradual and sometimes constantly varying ratios provided by a continuously variable condition, occupants are accustomed to these conventional vehicles changing between ratios even when the accelerator position has not changed as the vehicle speed increases. An exemplary method and system in accordance with the present disclosure takes advantage of such an opportunity to mimic a discrete ratio transmission by altering the actual ratio path to return to a ratio path on a predefined ratio map after a predetermine amount of time has elapsed while the accelerator position has been held substantially constant and when the actual ratio path is not currently following a ratio path on the predefined ratio map.

FIG. 7 illustrates this situation. The actual ratio path 700 initially follows the ratio path 702 of a predefined ratio map until a vehicle speed 704 is reached and the ratio path 702 no longer satisfies a gradient constraint. The actual ratio path 700 then diverges from the ratio path 702 in a manner similar to that described previously in association with FIG. 5. At point 706, the exemplary method and system determines that a predetermined amount of time has elapsed while the accelerator position has remained substantially constant and the actual ratio path 700 is then transitioned to a ratio on the ratio path 702 at point 708. In this manner, the actual ratio is adjusted to more closely align or follow the ratio path 702 while always satisfying the gradient constraint. In this instance, the actual ratio path 700 again diverges from the ratio path 702 to ensure gradient constraint compliance and again returns to follow the ratio path 702 when the actual ratio path coincides again with the ratio path 702 at point 710 (in a manner similar to that describe in relation to FIG. 5).

While in this instance the condition which prompted a return to the ratio path 702 may have been an extended steady state condition for the accelerator position, other conditions may also provide the opportunity to adjust the actual ratio path to return to a ratio path on a predefined ratio map and still comply with vehicle occupant expectations or in those situations where the driver or other occupant might not be surprised or even notice that the actual ratio path is being altered. For example, in addition to the extended steady state accelerator position, an increase in cabin noise due to a high radio volume, or an open window, or the like without limitation. Any factor or condition which may enable an actual ratio path to be transitioned to a position on a ratio path from a predefined ratio map which might not affect the driver/passenger experience or otherwise not meet with their expectations may be contemplated and still fall within the scope of the present disclosure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A propulsion system for a vehicle comprising:
   a prime mover having a rotating member;
   a rotating member sensor that outputs a rotating member speed signal;
   a driven member;
   a driver input sensor that outputs a driver input signal;
   a continuously variable transmission coupling the prime mover to the driven member; and
   a processor that is programmed to determine a current ratio of the continuously variable transmission, determine a projected ratio from a first ratio path of a predetermined ratio map, calculate a gradient of a ratio path extending between the current ratio and the projected ratio, determine whether the calculated gradient satisfies a predetermined gradient constraint, to set a control ratio to the projected ratio if the calculated gradient satisfies the gradient constraint, to set a control ratio to a modified ratio if the calculated gradient does not satisfy the gradient constraint, wherein the modified ratio is based upon a ratio that satisfies the gradient constraint, and to control the ratio of the continuously variable transmission to the control ratio.

2. The system of claim 1, wherein the processor is further programmed to prior to controlling the ratio of the continuously variable transmission:
   determine whether a transition condition has been met; and
   set the control ratio to a ratio on a second ratio path on the predefined ratio map.

3. The system of claim 2, wherein the transition condition comprises a change in driver input signal.

4. The system of claim 2, wherein the transition condition comprises a period of time elapsing while a driver input signal remains substantially constant.

5. The system of claim 2, wherein the transition condition comprises a rate of change of driver input signal exceeding a predetermined threshold.

6. The system of claim 2, wherein the transition condition comprises a vehicle speed exceeding a predetermined threshold.

7. The system of claim 1, wherein the predefined ratio map corresponds to an optimized fuel economy ratio map.

8. The system of claim 1, wherein the gradient constraint comprises a range of ratio path slopes.

9. The system of claim 1, wherein the gradient constraint comprises a positive ratio path slope.

10. The system of claim 1, wherein the driver input sensor comprises a driver pedal position sensor and the driver input signal comprises a driver pedal position signal.

11. A method for controlling a ratio of a continuously variable transmission coupling a prime mover to a driven member in a vehicle, the method comprising:
    determining a current ratio of the continuously variable transmission;
    determining a projected ratio from a first ratio path of a predetermined ratio map;
    calculating a gradient of a ratio path extending between the current ratio and the projected ratio;
    determining whether the calculated gradient satisfies a predetermined gradient constraint;
    setting a control ratio to the projected ratio if the calculated gradient satisfies the gradient constraint;
    setting a control ratio to a modified ratio if the calculated gradient does not satisfy the gradient constraint, wherein the modified ratio is based upon a ratio that satisfies the gradient constraint; and
    controlling the ratio of the continuously variable transmission to the control ratio.

12. The method of claim 11, further comprising:
    prior to controlling the ratio of the continuously variable transmission:
       determining whether a transition condition has been met; and
       setting the control ratio to a ratio on a second ratio path on the predefined ratio map.

13. The method of claim 12, wherein the transition condition comprises a change in driver input.

14. The method of claim 13, wherein the driver input comprises a driver pedal position.

15. The method of claim 12, wherein the transition condition comprises a period of time elapsing while a driver input remains substantially constant.

16. The method of claim 12, wherein the transition condition comprises a rate of change of driver input exceeding a predetermined threshold.

17. The method of claim 12, wherein the transition condition comprises a vehicle speed exceeding a predetermined threshold.

18. The method of claim 11, wherein the predefined ratio map corresponds to an optimized fuel economy ratio map.

19. The method of claim 11, wherein the gradient constraint comprises a range of ratio path slopes.

20. The method of claim 11, wherein the gradient constraint comprises a positive ratio path slope.

\* \* \* \* \*